United States Patent
Skidmore et al.

(10) Patent No.: US 9,996,535 B1
(45) Date of Patent: Jun. 12, 2018

(54) EFFICIENT HIERARCHICAL USER INTERFACE

(71) Applicant: Amazon Technologies, Inc., Seattle, WA (US)

(72) Inventors: David Paul Skidmore, Seattle, WA (US); Kai Di Chen, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 14/663,376

(22) Filed: Mar. 19, 2015

(51) Int. Cl.
*G06F 17/30* (2006.01)
*G06F 3/0481* (2013.01)

(52) U.S. Cl.
CPC ...... *G06F 17/30011* (2013.01); *G06F 3/0481* (2013.01)

(58) Field of Classification Search
CPC ......... G06F 17/30011; G06F 17/30864; G06F 3/0481; G06Q 10/10
USPC .......................................... 707/608; 715/810
See application file for complete search history.

(56) References Cited

U.S. PATENT DOCUMENTS

| | | | | |
|---|---|---|---|---|
| 8,086,504 | B1* | 12/2011 | Dicker et al. | 705/27.1 |
| 8,566,329 | B1* | 10/2013 | Freed et al. | 707/748 |
| 2010/0083173 | A1* | 4/2010 | Germann | G06F 17/30997 715/810 |
| 2011/0050593 | A1* | 3/2011 | Kim et al. | 345/173 |

OTHER PUBLICATIONS

MARC 21 Home, MARC 21 Specifications for Record Structure, Character Sets, and Exchange Media, Exchange Media: Part 1, Dec. 6, 2007, 4 pages.*

Sadjadi et al. "Robust Front-End Processing for Speaker Identification Over Extremely Degraded Communication Channels." Center for Robust Speech Systems (CRSS), The University of Texas at Dallas, Richardson, TX 75080-3021, USA. (May 2013). pp. 7214-7218.

* cited by examiner

*Primary Examiner* — Jean B Fleurantin
(74) *Attorney, Agent, or Firm* — Knobbe, Martens, Olson & Bear, LLP

(57) ABSTRACT

Systems and methods are provided for generating organization data for an efficient presentation and/or organization of a collection of items. In some embodiments, the organization data may be based on metadata associated with items, such as keywords. The metadata may be generated from natural language processing of the items. Organization data and/or a hierarchical data organization may be a tree data structure that can be efficiently navigated to reach and/or locate an item. In some embodiments, organization data may be automatically updated in response to a document removal, addition, and/or a user selection. For example, as items are removed and/or added to the collection, keywords, counts, directories, nodes, and/or levels of the organization data may update and/or change to reflect the updated collection of items.

18 Claims, 12 Drawing Sheets

EFFICIENT HIERARCHICAL USER INTERFACE

BACKGROUND

In computing, user interfaces are often provided to present a file system to a user. For example, a user may browse or scroll through a list of items in a flat file system. In another example, files may be organized or displayed in a hierarchical structure of folders. Typically, it is the responsibility of the user to determine and maintain the hierarchical structure. The structure of the folders does not change unless the structured is modified by the user.

DETAILED DESCRIPTION

Figure 1:
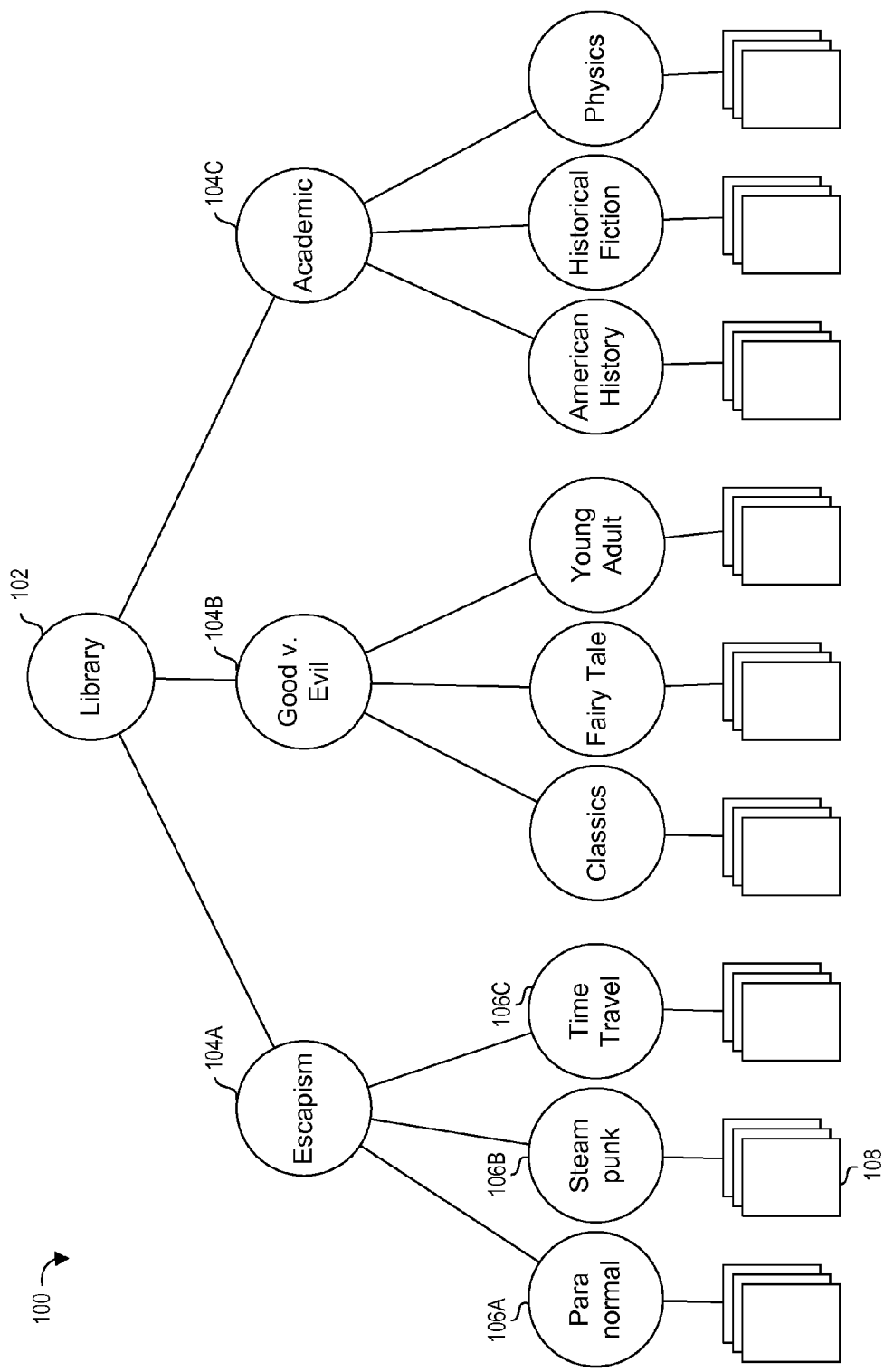
FIG. 1 is an example representation of an efficient hierarchical data structure for presenting documents, generated at least in part by an organization service.

Due to the ever-increasing amount of information available to users of electronic computing systems, there is an ongoing need to efficiently organize and/or present documents to users. Such documents are often manually curated and/or organized by a human user, such as the organization of documents in an operating system and/or a library. Manual organization is difficult and/or may lead to disorganization over time. For example, as new documents are added and/or documents are removed the initial organization, such as the initial arrangement of a hierarchical electronic file system used to store electronic documents, media files, and/or other items, may become outdated, inadequate, and/or inefficient for browsing and/or navigating the collection. In some embodiments, a preferred method for organizing documents may be automated based on the content of the documents and/or metadata associated with the documents. For example, organization data, such as an electronic data indicating tags, directories (such as a folder), and/or documents linked with the directories, may be generated that facilitates efficient maintenance and/or efficient updates to the presentation of the documents to a user. The organization data may represent a hierarchical structure of folders and documents. The optimal and/or near optimal organization of the documents may minimize the number of subcategories that must be navigated to locate and/or reach a document in the operating system and/or library. Furthermore, organization data and/or a hierarchical data organization structure may include a balanced tree to enable efficient navigation of the collection. As stated above, a user defined and/or generated organization may become unbalanced and/or inefficient over time because it may be difficult for a user to anticipate their future organizational needs. Thus, in some embodiments, it may be advantageous to dynamically reorganize and/or rebalance generated organization data and/or a hierarchical data organization structure based on metadata associated with documents.

Generally described, aspects of the present disclosure relate to generating and/or updating organization data and/or a hierarchical data organization for efficient presentation of a collection of documents. For example, according to some embodiments, a collection of documents may be analyzed by natural language processing (or some other machine learning technique to derive a meaning, keyword, or tag associated with the document) to determine document metadata associated with the documents. Document metadata may include keywords, tags, and/or categories associated with the documents. The document metadata may be analyzed to determine hierarchical metadata, such as the frequencies of occurrence and/or counts of the tags for the collection of documents. As used herein, a frequency of occurrence is a relative number, such as, but not limited to, a percentage of documents associated with a tag. As used herein, a count of tags refers to an absolute number, such as but not limited to, the number of documents associated with a tag. Thus, the spectrum of broader to narrower and/or more specific tags may be determined based on the hierarchical metadata. Furthermore, there may be a configurable threshold for an optimal number of documents to present to a user in a graphical user interface, an audio user interface, and/or any other type of user interface. A hierarchical data organization structure, such as a tree, may be generated based on the hierarchical metadata, the document metadata, and/or the document viewing and/or item presentation threshold to build a balanced data structure for navigating the documents. If documents are added and/or removed from the collection, the collection of documents and/or associated metadata may be reprocessed to rebalance the hierarchical data organization. Thus, a dynamic view of the collection of the documents may be presented to the user for efficient navigation and/or browsing.

Although examples discussed herein are often described with respect to books, this is for illustrative purposes and is not meant to limit the scope of the presentation and/or organization techniques described herein, which can be used to accommodate other types of items and/or documents as well. Non-limiting examples of items and/or documents include ebooks, word processing documents, spreadsheets, electronic documents, text files, news articles, images, audiobooks, podcasts, news programs, musical works, television programs, video clips, movies, multimedia content, video games, and any other type of content that may be organized hierarchically and/or associated with any type of textual content.

While a library environment for books is often used as an example below, it will be appreciated that methods for determining collections of items and/or organizing items, as disclosed herein, may be used in a variety of environments other than a library environment. For example, aspects of the present disclosure, in some embodiments, may be used and/or implemented to efficiently browse items within any user interface, voice user interface, graphical user interface, page, video, electronic book and/or other electronic content.

In some embodiments, items may be browsed and/or navigated using audio commands with an audio command device for playing content such as songs, video, audiobooks, etc. Without limitation, aspects of the present disclosure may be used for efficient item browsing in an electronic file system and/or file management system, such as a user interface for an operating system. In some embodiments, the techniques disclosed herein may be used for browsing digital news articles, digital photo albums, editorial content, videos, classified listings, auction listings and/or any other content that may be electronically presented to a user.

A tree data structure is often used as an example below. As used herein, in addition to having their ordinary meaning, the following terms are used with the tree example: a "root" is the top node in a tree; a "child" and/or "sub-node" is a node that directly descends from a higher node; a "parent" is the converse of a child; a "descendent" is a node reachable by traversing from parent to child; a "leaf" is a node with no children; an "item" in the tree descends directly from a leaf node; an "internal node" is a node with at least one child node; the "level" of a node is defined by the number of connections between the node and the root; the "height" of a tree is a number of connections on the longest downward path between the root and the leaf node; and the "width" of a level is the number of nodes on that particular level.

While a tree data structure and/or organization tree is often used as an example below, this is for illustrative purposes and is not meant to limit the scope of the present disclosure, which can be used to accommodate other types of hierarchical data organizations and/or structures. Non-limiting examples of hierarchical data organizations include digraphs, linked objects, clusters, a TreeMap, a hierarchical hashmap, and/or any other type of data structure that may be organized hierarchically and/or clustered.

As used herein, in addition to having its ordinary meaning, a "tag" refers to textual data such as, but not limited to, a label that is associated with content. For example, as described herein, a tag may be generated for an item and/or document based on natural language processing of the content of the item and/or document. A tag may include keywords and/or categories. As used herein, in addition to having its ordinary meaning, a "keyword" refers to one or more words and/or phrases of words from the content of an item and/or document. As used herein, in addition to having its ordinary meaning, a "category" refers to a classification of an item and/or document.

As used herein, in addition to having its ordinary meaning, an "item presentation threshold" refers to a number of items to be presented in a user interface. For example, an item presentation threshold may refer to a number of items to be graphically displayed in a user interface or a number of items to be presented in an audio user interface. As used herein, in addition to having its ordinary meaning, a "document viewing threshold" refers to a number of documents to be graphically displayed in a user interface.

FIG. 1 is an example representation of an efficient hierarchical data organization and/or structure, which may have been generated at least in part by an organization service. The collection of items may be a library of books. As illustrated, hierarchical data organization 100 may be a tree with root node 102. As will be described in further detail below, a user may be presented with a user interface to browse and/or navigate the library starting from root node 102. A first level of example hierarchical data organization 100 may include three children nodes 104A-104C, which may correspond to three categories and/or tags common to all items in the collection. For example, child node 104A, "Escapism," may represent that all of its children nodes and/or items relate to a subject matter category that may include fictional categories such as fantasy, science fiction, detected, romance, spy, and/or genres that allow the reader a psychological escape. Accordingly, children nodes 106A-106C may correspond to sub-categories of "Escapism" such as "Paranormal," "Steampunk," and "Time Travel," respectively. Items 108 may correspond to books that fall and/or have been categorized into "Steampunk," which are also part of the broader "Escapism" category. An example book and/or item under node 106B may be *Twenty Thousand Leagues Under the Sea* by Jules Verne. In some embodiments, particular aspects of hierarchical data organization 100 may be beneficial to the user browsing and/or navigation experience of the library. For example, each leaf level category, including nodes 106A-106C, may include approximately the same number of items, such as ten items per leaf node and/or category. Furthermore, hierarchical data organization 100 may be balanced such that some and/or most of the leaf nodes are on or about the same level. As illustrated, the leaf nodes of example hierarchical data organization 100 are all on the third level of the tree. In some embodiments, the height of hierarchical data organization 100 may be approximate to and/or near the width of the tree. For example, hierarchical data organization 100 may have three levels and the root node may have three children. In other words, the tree may approximate a square shape.

Figure 2A:
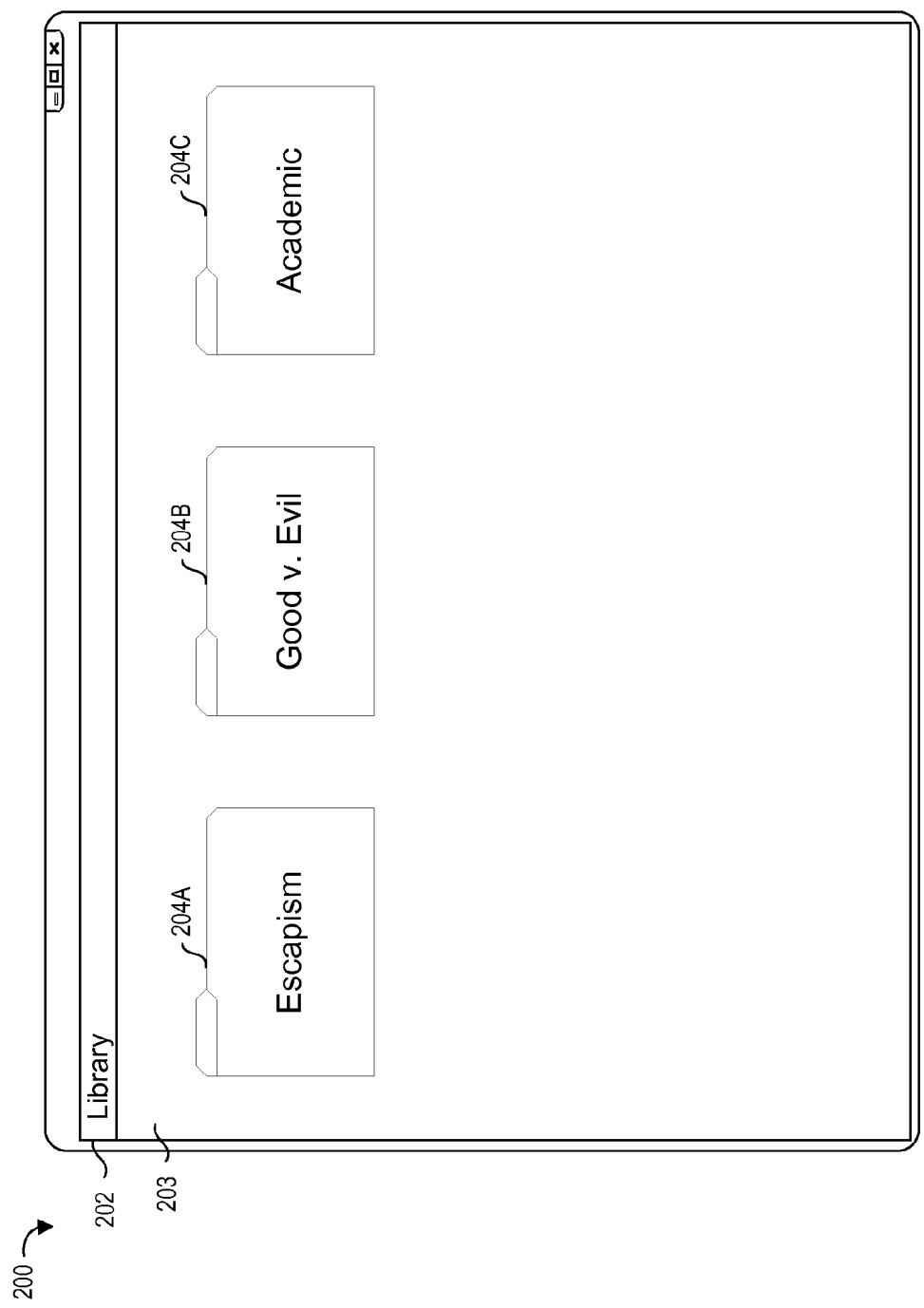
FIGS. 2A-2C are pictorial diagrams depicting an example sequence of user interface representations illustrating navigation of a hierarchical data organization.
Figure 2B:
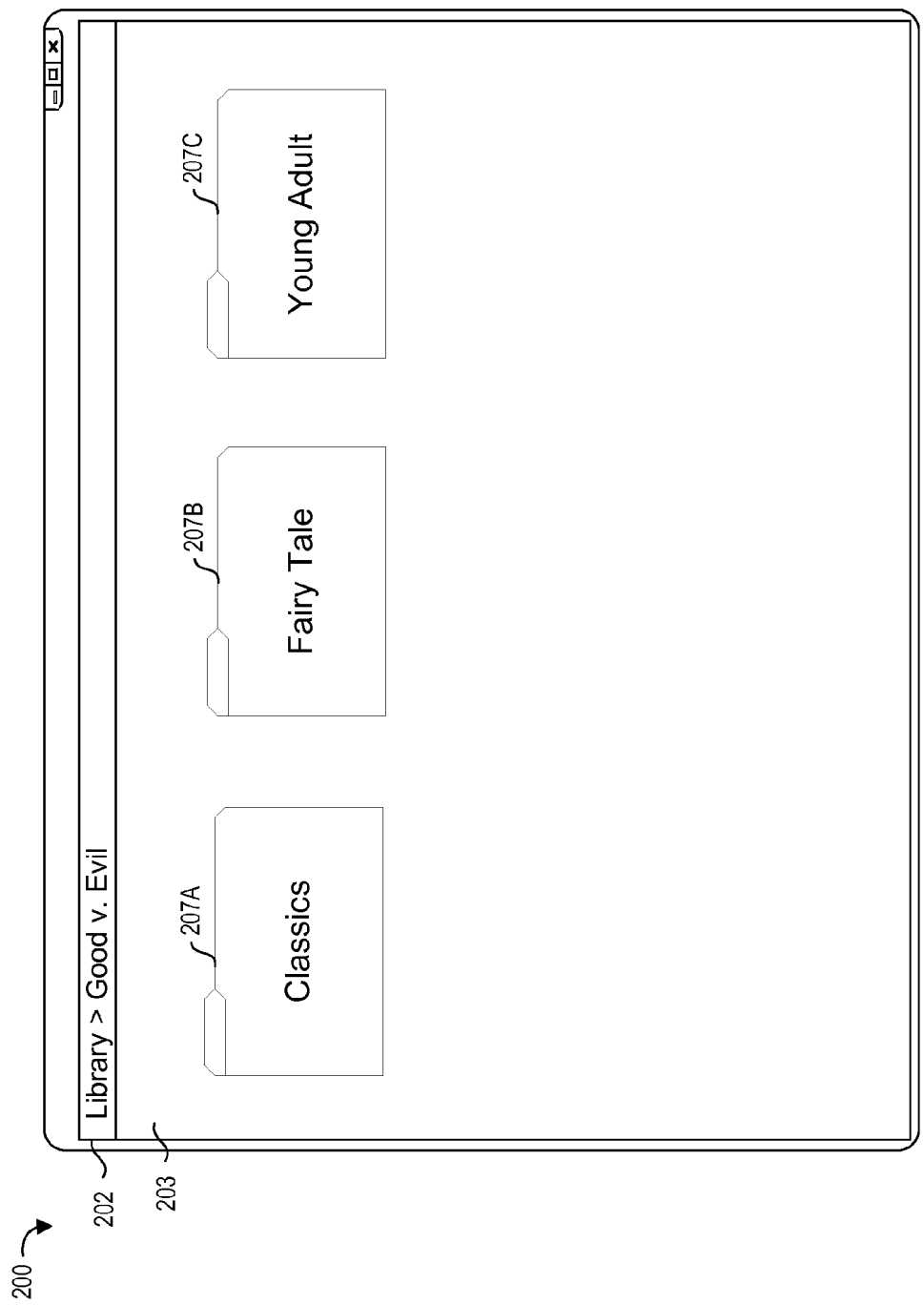
Figure 2C:
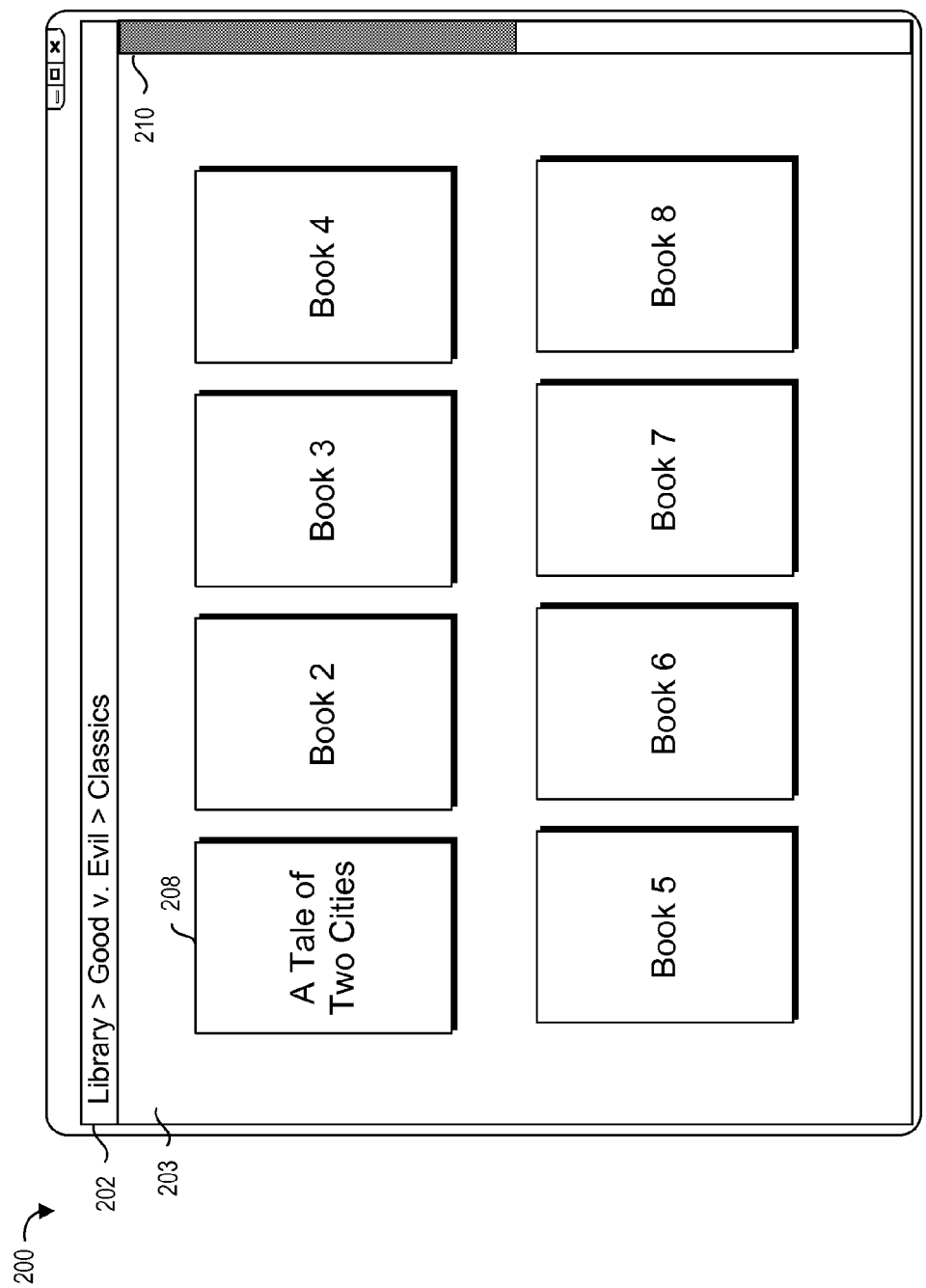

FIGS. 2A-2C depict an example sequence of user interface representations illustrating navigation of a hierarchical data organization, generated at least in part by an organization service described in further detail below. Illustrative user interface 200 includes a navigation bar 202. As illustrated in FIG. 2A, navigation bar 202 indicates that user interface 200 may be presenting the root node of the library, which may correspond to the hierarchical data organization 100 of FIG. 1. In some embodiments, navigation bar 202 may be configured to receive user input for further navigation. For example, navigation bar 202 may receive a user selection of a node and/or textual input of a node and/or node path. As illustrated, presentation of the root and/or "Library" node includes the children and/or sub-nodes 204A-204C in presentation area 203. Nodes, directories, and/or folders 204A-204C may be selected for further navigation, which is described in further detail below.

As illustrated in FIG. 2B, user interface 200 may update following a selection of a node. A selection of a node may be made, for example, by using a pointing device (e.g., a mouse, a stylus, or a finger) to click or double-click the node. For example, nodes 207A-207C may correspond to the children nodes of node 204B, "Good v. Evil," of FIG. 2A. As illustrated, navigation bar 202 may indicate the current node and/or folder of user interface 200, such as "Library>Good v. Evil." While no items and/or documents are illustrated in FIG. 2A, it will be appreciated that in some embodiments a presentation of an internal node may display items and/or documents that descend from that internal node. For example, an alternative embodiment similar to FIG. 2B may include a presentation of items and nodes that may be selected.

As illustrated in FIG. 2C, user interface 200 may update following a selection of a leaf node. For example, user interface 200 may present documents and/or items such as document 208, which may correspond to A Tale of Two Cities by Charles Dickens. Each document and/or item of user interface 200 may be categorized and/or tagged under both "Classics" and "Good v. Evil." As illustrated, user interface 200 may include navigation element 210 that may allow user navigation of presentation area 203. For example, there may be additional documents and/or items which may be presented in presentation area 203 following user selection of the navigation element 210. In some embodiments, there may be a determined, pre-defined, and/or threshold viewing number that corresponds to an optimal number of items to present in a view of a leaf node, which is described in further detail below. For example, user interface 200 may include a document viewing and/or item presentation threshold number of ten, which corresponds to a maximum and/or preferred number of items that may be presented in user interface 200.

In some embodiments, user interface 200 may be configured to permit searching of items (not illustrated). For example, user interface 200 may receive text input to filter and/or display nodes and/or levels of the hierarchical data organization associated with the text input. One or more search and/or natural language processing techniques may be used to allow a user to navigate the library. For example, organization service 410 may receive search input, "school," and cause the presentation of the "academic" node in user interface 200.

FIGS. 3A-3D is an example sequence depicting representations of an efficient hierarchical data structure, which is dynamically updated in response to the removal and/or addition of data, updated at least in part by an organization service. As illustrated in FIGS. 3A-3D, aspects of hierarchical data organization 300 may be similar to hierarchical data organization 100 of FIG. 1. For example, hierarchical data organization 300 of FIG. 3A may include a root node, internal nodes, leaf nodes, and/or items that correspond to root node 102, internal nodes, leaf nodes, and/or items of hierarchical data organization 100, respectively. However, hierarchical data organization 300 may have less documents and/or items than hierarchical data organization 100. For example, leaf node 306, "Paranormal" may not include any documents and/or items, unlike leaf node 106A of FIG. 1. Thus, hierarchical data organization 300 may illustrate a state of the library following deletions and/or removal of items from the library. In another example (not illustrated), a library may have items at a depth of seven levels and no items in other leaf nodes, and/or particular leaf nodes may have a majority of the items, which may be beyond a threshold item count, and few items in other leaf nodes leaving the hierarchical data organization and/or tree unbalanced.

Figure 3A:
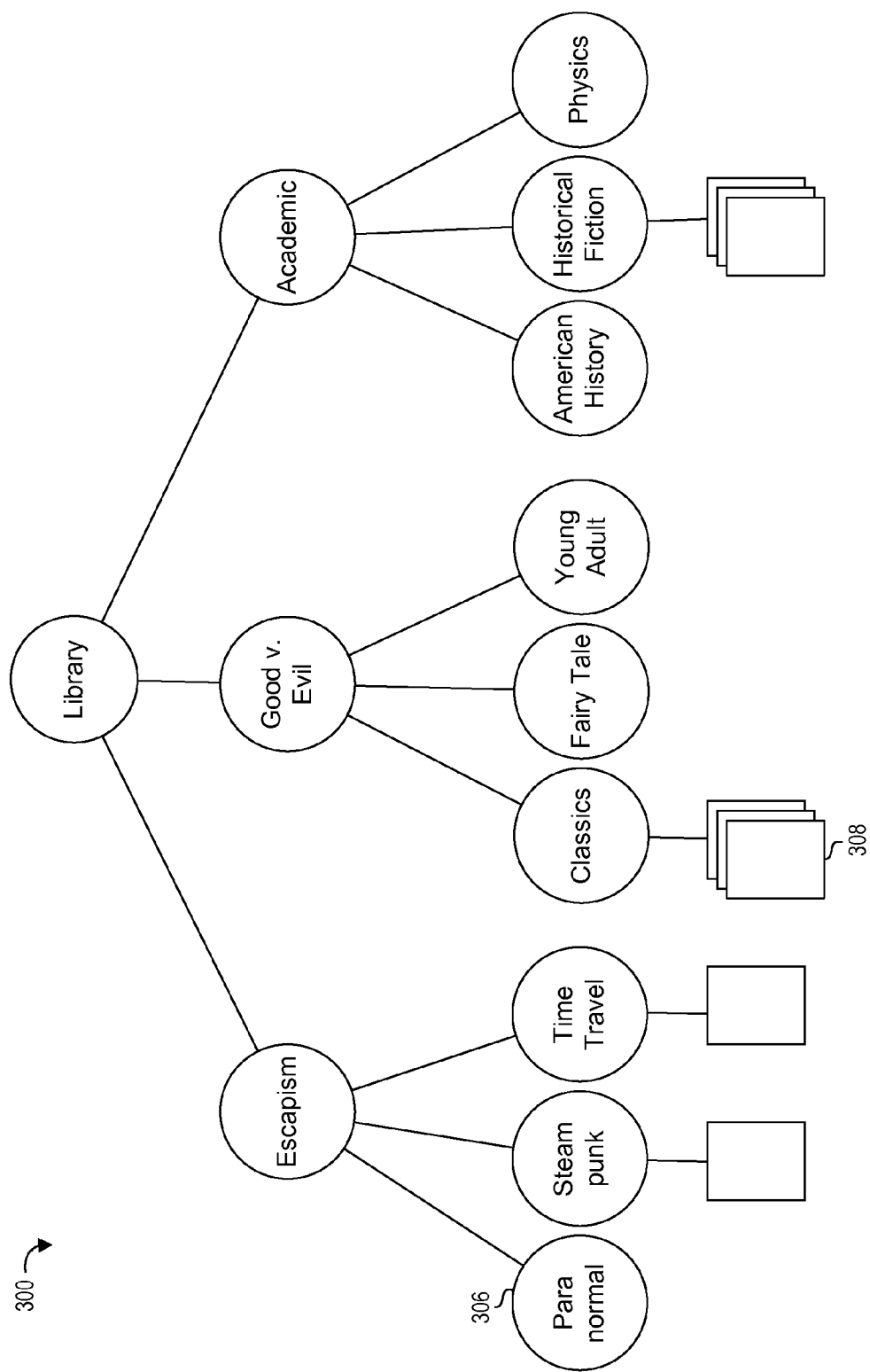
FIGS. 3A-3D are an example sequence depicting representations of an efficient hierarchical data structure, which is dynamically updated in response to the removal and/or addition of data, updated at least in part by an organization service.
Figure 3B:
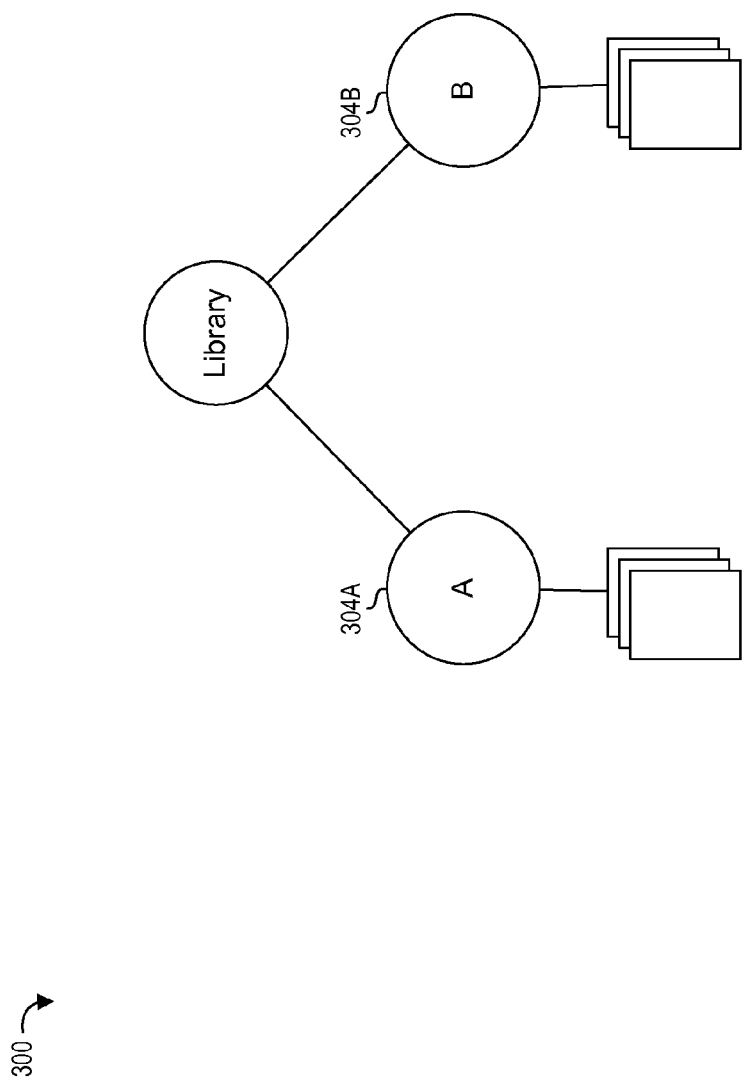

As illustrated in FIG. 3B, an organization service may dynamically reorganize, rebalance, and/or determine nodes of hierarchical data organization 300. For example, tags and/or metadata of the items from hierarchical data organization 300 may be analyzed to determine nodes of the library for efficient navigation. In the example from FIG. 3A, there may be an item presentation threshold of thirteen items and the total remaining items of hierarchical data organization 300 may equal twenty items that correspond to four respective leaf nodes. If hierarchical data organization 300 did not reorganize and/or rebalance, then a user may be required to inefficiently navigate multiple levels to reach items 308 of FIG. 3A and/or some leaf nodes may only present one item, for example. In other words, following a change to the number of items in the library the hierarchical data organization 300 may become unbalanced and/or lopsided. Therefore, organization service may determine an optimal and/or near optimal hierarchical data organization 300 that includes two leaf nodes of ten items each, as illustrated by FIG. 3B. Hierarchical data organization 300 may be efficient because it only requires one level of navigation before reaching a leaf level that includes items within the item viewing threshold. Furthermore, the leaf nodes 304A and 304B may not correspond to a presented node from FIG. 3A because an organization service may dynamically present nodes based on metadata associated with the items, which is described in further detail below. In other words, keywords, tags, and/or categorizations from item data may be hidden and/or dormant until there is an action and/or event that triggers reorganization of the hierarchical data structure.

Figure 3C:
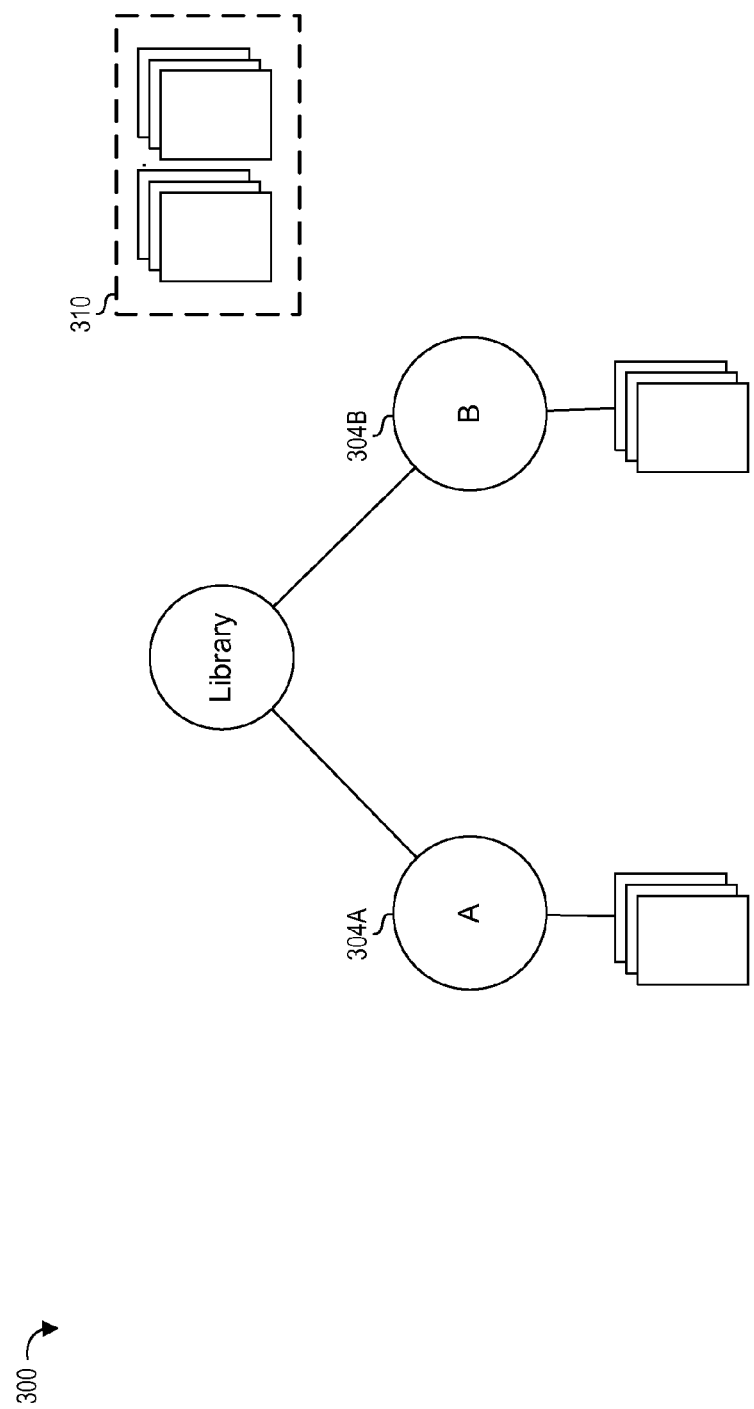
Figure 3D:
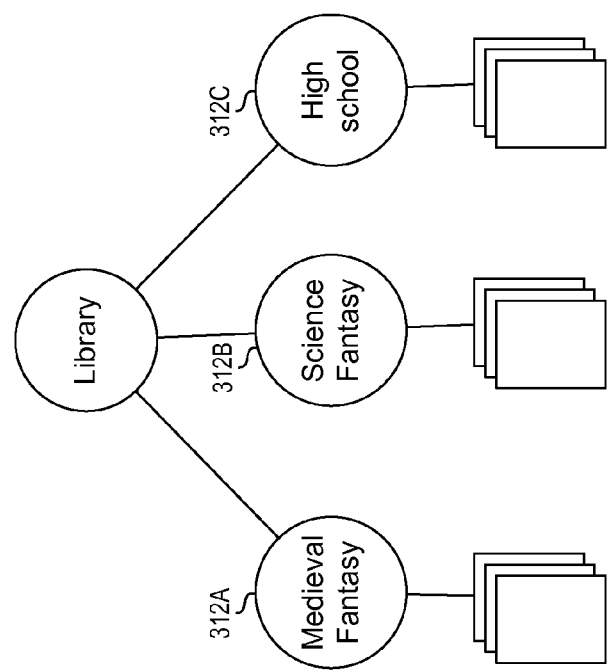

As illustrated by FIGS. 3C and 3D, an organization service may further reorganize hierarchical data organization 300 based on the addition of items. For example, additional items 310 may correspond to eighteen new items to be added to hierarchical data organization 300. An organization service may determine, retrieve, and/or analyze metadata of additional items 310. Similar to the sequence illustrated in FIGS. 3A and 3B of an organization service determining nodes and/or categories for presentation, an organization service may determine internal nodes 312A-312C of FIG. 3D, which may be different than internal nodes 304A and 304B of FIG. 3C. The items 310 of FIG. 3C may be incorporated into hierarchical data organization 300 by being linked, connected, and/or associated with one or more nodes 312A-312C.

Figure 4:
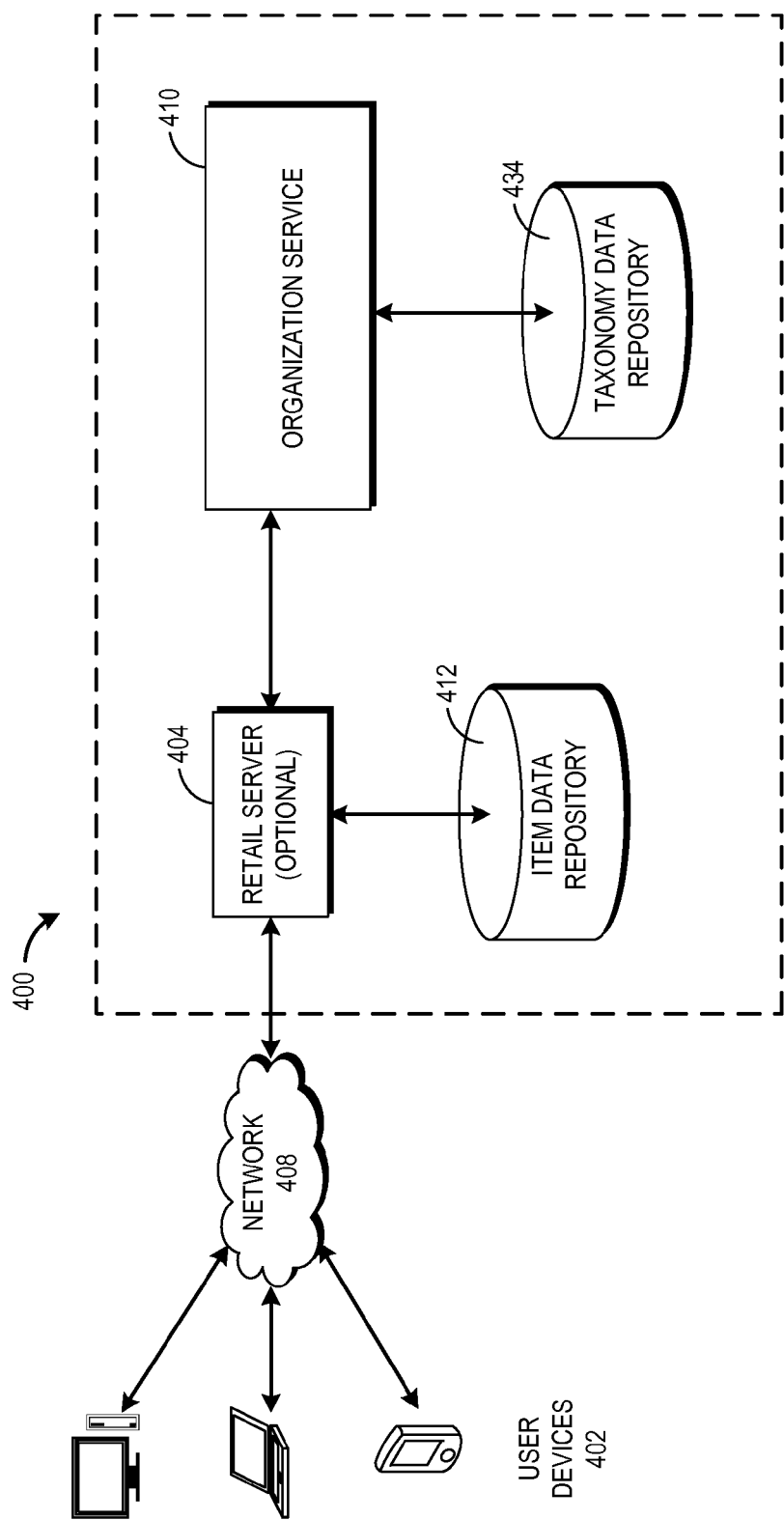
FIG. 4 is a block diagram depicting an illustrative operating environment for presenting users with efficient hierarchical user interfaces.

The illustrative operating environment shown in FIG. 4 includes an electronic catalog system 400 that enables users to browse and/or select items (such as items listed in an electronic catalog and/or library). The catalog system 400 may include an organization services 410 and a taxonomy data repository 434 stored in memory therein that may be used to implement various aspects of the present disclosure, such as determining a hierarchical data organization and/or updating a hierarchical data organization, and other aspects discussed herein. Taxonomy data repository 434 may store item content metadata, hierarchical content metadata, data structures, hierarchical data organizations, and/or other data, which is described in further detail below. The catalog system 400 may also include one or more optional retail servers 404 that facilitate electronic browsing and purchasing of items, such as goods and/or services, using various user devices, such as user computing devices 402. User computing devices 402 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server 404 may be connected to and/or in communication with an item data repository 412 that stores item information regarding a number of items, such as items listed in an electronic catalog as available for browsing and/or purchasing via the retail server 404. Item data stored in item data repository 412 may include any information related to each item. For example, item data may include, but is not limited to, price, availability, title, item identifier, item images, item description, item attributes, item text, etc. In some embodiments, the item data repository 412 may store digital content items (e.g., audiobooks, electronic books, music, movies, multimedia works, etc.). The retail server 404 may also be connected to or in communication with a user data store (not illustrated) that stores user data associated with users of retail server 404, such as account information, purchase history, browsing history, item reviews and ratings, personal information, user preferences, location information, etc.

In some embodiments, each of item data repository 412 and/or taxonomy data repository 434 may be local to organization service 410, may be local to retail server 404, may be remote from both organization service 420 and retail server 404, and/or may be a network-based service itself. The item data repository 412 and/or taxonomy data repository 434 may be embodied in hard disk drives, solid state memories, any other type of non-transitory computer-readable storage medium, and/or a file, a database, a relational database, in-memory cache, and/or stored in any such non-transitory computer-readable medium accessible to the retail server 404. The item data repository 412 and/or taxonomy data repository 434 may also be distributed or partitioned across multiple local and/or storage devices without departing from the spirit and scope of the present disclosure.

In the environment shown in FIG. 4, a user of the catalog system 100 may utilize a user computing device 402 to communicate with the retail server 404 via a communication network 408, such as the Internet or other communications link. The network 408 may be any wired network, wireless network or combination thereof. In addition, the network 408 may be a personal area network, local area network, wide area network, cable network, satellite network, cellular telephone network, etc. or combination thereof. In addition, the network 408 may be a personal area network, local area network, wide area network, over-the-air broadcast network (e.g., for radio or television), cable network, satellite network, cellular telephone network, or combination thereof. For example, the network 408 may be a publicly accessible network of linked networks, possibly operated by various distinct parties, such as the Internet. In some embodiments, the network 408 may be a private or semi-private network, such as a corporate or university intranet. The network 408 may include one or more wireless networks, such as a Global System for Mobile Communications (GSM) network, a Code Division Multiple Access (CDMA) network, a Long Term Evolution (LTE) network, or some other type of wireless network. The network 408 may use protocols and components for communicating via the Internet or any of the other aforementioned types of networks.

The catalog system 400 is depicted in FIG. 4 as operating in a distributed computing environment including several computer systems that are interconnected using one or more computer networks. The marketplace system 400 could also operate within a computing environment having a fewer or greater number of devices than are illustrated in FIG. 4. Thus, the depiction of catalog system 400 in FIG. 4 should be taken as illustrative and not limiting to the present disclosure. For example, the marketplace system 400 could implement various Web services components and/or peer-to-peer network configurations to implement at least a portion of the processes described herein.

In brief, the retail server 404 is generally responsible for providing front-end communication with various user devices, such as a user computing device 402, via network 108. The front-end communication provided by the retail server 404 may include generating text and/or graphics, possibly organized as a user interface using hypertext transfer or other protocols in response to information inquiries received from the various user devices. The retail server 404 may obtain information on available goods and services from one or more data stores, such as item data repository 412, as is done in conventional electronic commerce systems. In certain embodiments, the retail server 404 may also access item data from other data sources, either internal or external to marketplace system 400. While catalog system 400 is often described herein with respect to an embodiment in which organization service 410 communicates with a retail server 404 in a library environment, in other embodiments, an organization service 410 may operate independently of a library environment. In some such embodiments, the organization service 410 may communicate with a user computing device 102 without the presence of a retail server, or may communicate with another server responsible for providing front-end communication with the computing device 102. In other embodiments, the retail server 404 may include or implement an organization service, as described herein, such that a separate organization service 410 may not be present in certain embodiments.

Figure 5:
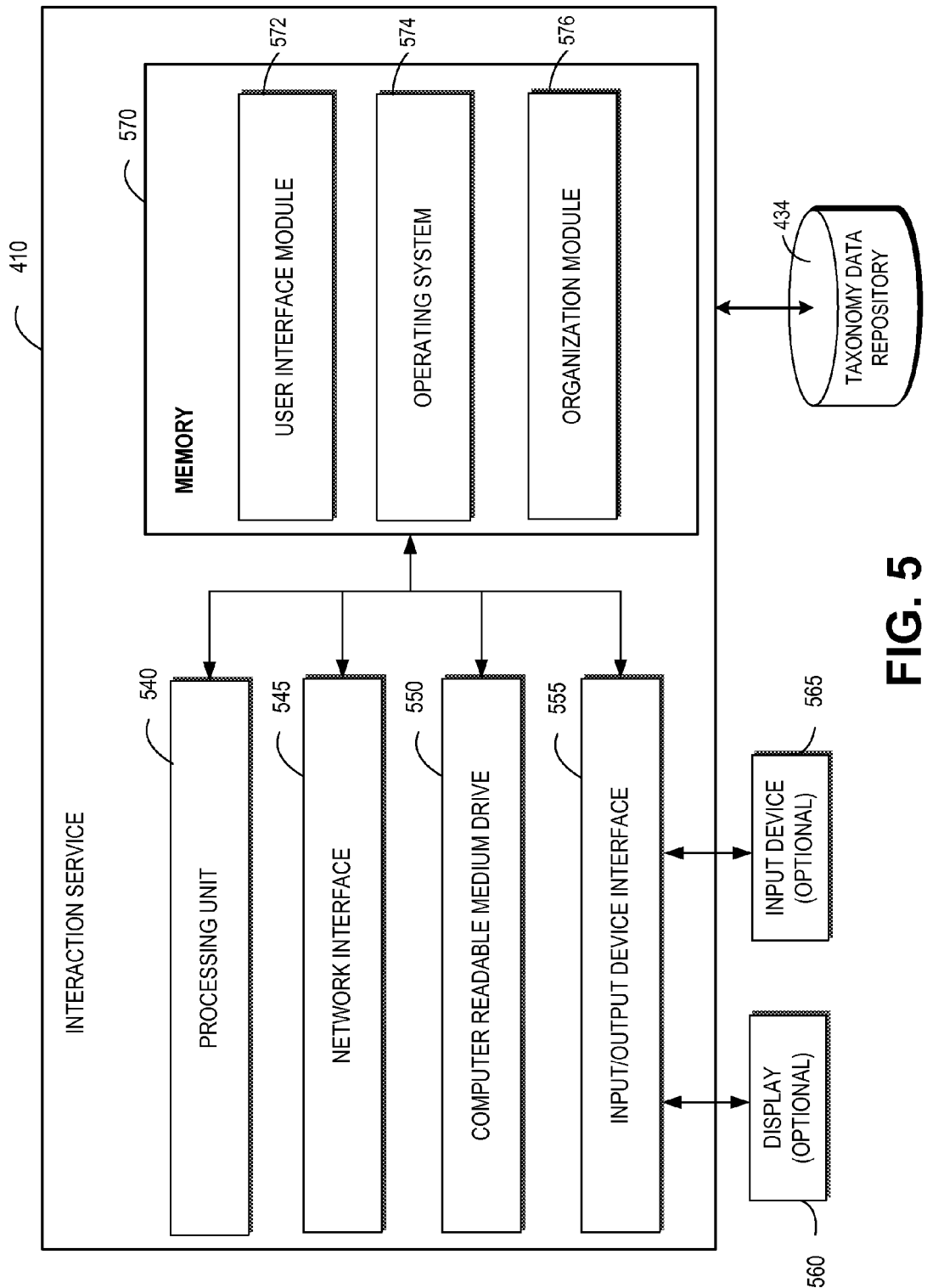
FIG. 5 depicts a general architecture of an example computing device providing an organization service for determining efficient organization data.

FIG. 5 depicts a general architecture of a computing system (referenced as organization service 410) that determines collections of items, generates hierarchical data organizations, and/or updates at least a portion of the hierarchical data organizations. The general architecture of the organization service 410 depicted in FIG. 5 includes an arrangement of computer hardware and software components that may be used to implement aspects of the present disclosure. The organization service 410 may include many more (or fewer) elements than those shown in FIG. 5. It is not necessary, however, that all of these generally conventional elements be shown in order to provide an enabling disclosure. As illustrated, the organization service 410 includes a processing unit 540, a network interface 545, a computer readable medium drive 550, an input/output device interface 555, a display 560, and an input device 565, all of which may communicate with one another by way of a communication bus. The network interface 545 may provide connectivity to one or more networks or computing systems. The processing unit 540 may thus receive information and instructions from other computing systems or services via the network 408. The processing unit 540 may also communicate to and from memory 570 and further provide output information for an optional display 560 via the input/output device interface 555. The input/output device interface 555 may also accept input from the optional input device 565, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or other input device.

The memory 570 may contain computer program instructions (grouped as modules or components in some embodiments) that the processing unit 540 executes in order to implement one or more embodiments. The memory 570 generally includes RAM, ROM and/or other persistent, auxiliary or non-transitory computer-readable media. The memory 570 may store an operating system 574 that provides computer program instructions for use by the processing unit 540 in the general administration and operation of the interaction service 520. The memory 570 may further include computer program instructions and other information for implementing aspects of the present disclosure. For example, in one embodiment, the memory 570 includes a user interface module 572 that generates user interfaces (and/or instructions therefor) for display upon a computing device, e.g., via a navigation interface such as a browser or application installed on the computing device. In addition, memory 570 may include or communicate with taxonomy data repository 534 and/or one or more other data stores, as discussed above with reference to FIG. 4.

Organization module 576 may determine hierarchical data organizations and/or determine groupings of items. While organization module 576 is shown in FIG. 5 as part of the organization service 410, in other embodiments, all or a portion of an organization module 576 may be implemented by the retail server 110 and/or another computing device. For example, in certain embodiments of the present disclosure, all or a portion of an organization module 576 may be implemented by operating system 574, such as for displaying documents and/or files of an operating system. In some embodiments, the retail server 404 may include several components that operate similarly to the components illustrated as part of the organization service 410, including a user interface module, an organization module, processing unit, computer readable medium drive, etc. In such embodiments, the retail server 404 may communicate with a taxonomy data store, such as taxonomy data repository 434, and the organization service 410 may not be needed in certain embodiments. Further, although certain examples are illustrated herein in the context of a retail server 404, this is not a limitation on the systems and methods described herein. It will also be appreciated that, in some embodiments, a user device may implement functionality that is otherwise described herein as being implemented by the elements and/or modules of the organization service 410. For example, the user computing device 402 may implement natively and/or receive code modules or other instructions from the retailer server 404 and/or organization service 410 via the network 408 that are executed by the user computing device 402 to implement various aspects of the present disclosure.

Figure 6:
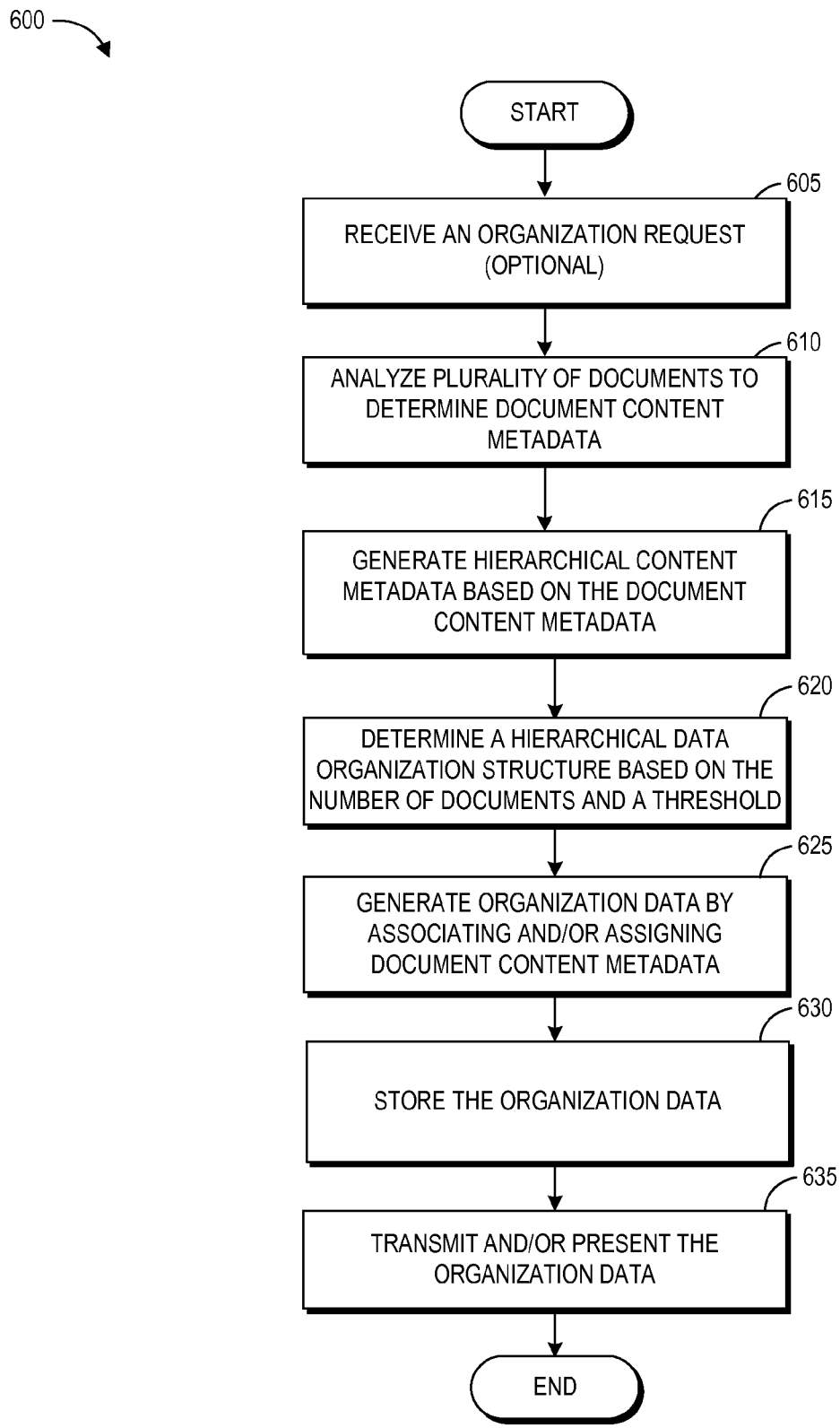
FIG. 6 is a flow diagram of an illustrative method implemented at least in part by an organization service for determining organization data.

FIG. 6 is a flow diagram of an illustrative method 600 implemented at least in part by organization service 410 for determining a hierarchical data organization and/or organization data based on document and/or item metadata. For example, organization data can include data indicating keywords and/or terms that have been selected as nodes and/or folders and items linked with the nodes and/or folders. While the illustrative method will be described below as being implemented by the components of organization service 410, such as the organization module 576, in other embodiments, a similar method may be implemented by the retail server 404, such as by including organization module 576, or other computing system responsible for providing front-end communication with a user computing device. As discussed above, illustrative method 600 may be implemented entirely by a user device, such as user computing device 102, in some embodiments.

The illustrative method 600 begins at block 605, where organization service 410 receives an organization and/or reorganization request. Organization service 410 may generate, update, and/or rebalance organization data in response to receiving the organization requests. In some embodiments, an organization request may be generated in response to an event and/or action. Non-limiting examples of events interactions that may trigger an organization request include the first time items and/or documents are added to a data store, the addition and/or removal items, as described above, a threshold number of added and/or removed items, periodic or predefined intervals, a user request, and/or some combination thereof. For example, there may be a threshold number of additions and/or removals before reorganization and/or rebalance is triggered. Alternatively or in addition to, organization service 410 may notify and/or alert a user that a reorganization and/or rebalance is recommended. In some embodiments, the reorganization and/or rebalance may occur in response to approval by the user and/or selection by the user to rebalance the organization data. In some embodiments, in response to receipt of the document removal and/or addition request, organization service 410 may add and/or remove one or more items from the library, collection of items, data store, and/or electronic file system. Receipt of an organization request for organization service 410 to generate and/or update organization data may be optional in some embodiments. For example, organization service 10 may generate and/or update organization data without receiving an organization request.

At block 610, organization service 410 analyzes a plurality of documents and/or items to determine document and/or item content metadata. For example, an item may include and/or be associated with textual, word, and/or character data. One or more natural language processing techniques may be used to determine and/or output metadata associated with the item such as one or more tags and/or keywords. A third-party natural processing engine and/or library may be used to determine metadata, tags, a taxonomy, topics, and/or keywords associated with items. A natural language processing algorithm and/or system may process text of multiple languages. In some embodiments, natural language processing may be accomplished via one or more techniques and/or algorithms in artificial intelligence, machine learning, statistical and/or probabilistic machine learning, markov models, unsupervised learning, supervised learning, semi-supervised learning, and/or some combination thereof. For example, a natural language processing engine may associate the item and/or book, *A Tale of Two Cities*, with metadata including tags and/or keywords, such as "classics," "fiction," "historical fiction," "literature," "academic," "novels," "British Literature," "19$^{th}$ century," "France," "good versus evil," etc., based on analyzing the text and/or content of the item. In some embodiments, a visual recognition system may be applied to items such as images and/or videos to generate textual content that may be used as metadata and/or as input for a natural language processing algorithm and/or organization service 410. In some embodiments, item data associated with an item may be used as input to the natural language processing algorithm and/or system. In some embodiments, natural language processing and/or tagging of documents may be based on user data. For example, books and/or items purchased by a user may affect how items in the collection are processed and/or tagged. In some embodiments, metadata may be retrieved for items from a network resource, such as in the social networking context where metadata, tags, and/or keywords are user generated. Metadata may be retrieved for items based on a document creation time, publication date, author, document history, item data, and/or other properties associated with the item.

In some embodiments, document content metadata and/or item content metadata may be in various formats, such as JavaScript Object Notation ("JSON"), Extensible Markup Language ("XML"), a data object format, a file format that is proprietary to organization service 410, or any other format. For example, each document and/or item may be associated with a particular document and/or item content metadata file, such as a JSON file, which includes the tags, keywords, taxonomies, and/or categories associated with that document and/or item. Continuing with the example, document and/or item content metadata includes tags associated with the document, such as "classics," "fiction," "historical fiction," "literature," "academic," "novels," "British Literature," "19$^{th}$ century," "France," "good versus evil," etc. for *A Tale of Two Cities*.

At block 615, organization service 410 generates hierarchical content metadata based on the document and/or item content metadata. In an example library of one hundred books, organization service 410 at block 610 may have processed and/or retrieved item content metadata of the one hundred books. Organization service 410 may then process the item content metadata to generate hierarchical content metadata. A non-limiting example of hierarchical content metadata includes the total frequencies of occurrences, and/or counts of metadata, tags, and/or keywords. In the example library of one hundred books, fifteen of the books may include metadata associated with "classics," another twenty books may be associated with "historical fiction," etc. Thus, the hierarchical content metadata may provide a global summary of the document and/or items. For example, a broader category and/or tag may correspond to a parent node and narrower categories and/or tags may correspond to child nodes, which ultimately connect with documents and/or items. As a result, hierarchical categories and/or a taxonomy may be determined from the frequencies by organization service 410, which is described in further detail below. In some embodiments, hierarchical content metadata may be in various formats, such as JavaScript Object Notation ("JSON"), Extensible Markup Language ("XML"), a data object format, a file format that is proprietary to organization service 410, or any other format.

In some embodiments, the hierarchical output of the natural language processing engine may be used by organization service 410 to generate a hierarchical content metadata. For example, a taxonomy generated by a natural language processing engine may include a hierarchical structure of metadata. For example, a news article may be associated with a taxonomy of "Politics>Election>United States" and "Politics>Election>Referendum." In some embodiments, the taxonomy may represent broader and narrower categories and/or a hierarchical structure. Organization service 410 may use the taxonomy metadata for generating hierarchical content metadata. For example, as described below, a clustering algorithm may be used on the taxonomy and the collection of items to cluster items with common keywords and/or tags from the taxonomy. Furthermore, the natural language processing output may be associated with a degree of confidence, which may indicate the statistical likelihood regarding the accuracy of the metadata. Organization service 410 may use the statistical probabilities of the accuracy of the categorizations to generate the organization data described below.

At block 620, organization service 410 determines a hierarchical data organization and/or the structure of the hierarchical data organization based on the number of documents and/or items and one more thresholds. The hierarchical data organization structure can represent an organization relationship of the plurality of documents and/or items. For example, a hierarchical data organization may correspond to the representations illustrated in FIGS. 1, and/or 3A-3D. Organization service 410 may determine and/or retrieve a document and/or item presentation threshold that is associated with a maximum and/or desired number of documents and/or items to be presented to a user. For example, the document viewing threshold may be one, two, three, four, five, ten, etc., or some other number. In some embodiments, the document viewing threshold may be used to determine the maximum and/or desired number of nodes and/or folders to present to the user. In other embodiments, organization service 410 a node threshold, which may have a different value than the document viewing threshold. For example, a node threshold may be one, two, three, four, five, ten, etc., or some other number. In some embodiments, the one or more thresholds may be used to determine an optimal and/or near-optimal number of leaf nodes. In the example of a library of one hundred books, the document viewing threshold may be ten items. As a result, the optimal and/or near optimal number of leaf nodes may be ten, which may correspond to the total number of items divided by the document viewing threshold and/or an approximation thereof. In some environments, the hierarchical content metadata and/or the one or more thresholds may be used by organization service 10 to determine internal nodes of the hierarchical data organization, which is described in further detail below.

In some embodiments, the document viewing and/or item presentation threshold may be configurable and/or vary for the type of category and/or document type. For example, an item presentation threshold may be configured and/or based on user studies for different types of user devices and/or displays. Mobile computing devices may have different item presentation thresholds than desktop computers based on different display sizes, number of presentable items through an audio user interface, and/or number of displayable items in a user interface. For example, at block 620, organization service 410 accesses a display size of the user computing device to calculate an optimal and/or maximum number of items that can be displayed in the user interface. For example, the accessed display size includes a length and width in pixels, inches, millimeters, or in any other measurement unit. Continuing with the example, organization service 410 accesses a document and/or item representation size. The document and/or item representation size may include a length and width in pixels or any other measurement unit. In some embodiments, the document representation size may include spacing, in pixels or any other measurement unit, of a document from other documents and/or borders of a window. Continuing with the example, organization service 410 calculates the number of document representations, such as icons, that can fit within the display size of the user interface by dividing the display size by the accessed size and/or dimensions of the document representation. Thus, the document viewing threshold may be sixteen for a mobile computing device based on the display size of the mobile computing device and a size of a document in the user interface of the mobile computing device. In some embodiments, organization service 410 may automatically update the document viewing threshold and/or item presentation threshold based on the current settings of the user interface and/or display. For example, in a mobile computing user interface, a user can update device settings to display larger icons, which may increase the document representation size of respective documents. Continuing with the example, the current document viewing threshold may update in response to the user interface settings and/or the increase in the document representation size. In some embodiments, such as an audio user interface, the item presentation threshold may be configured to a number of items that some users can easily remember, such as seven items plus or minus two, and/or be configurable via user settings. Additionally or alternatively, the document viewing threshold may depend on the document type, such as a higher threshold for node including video types and a lower threshold for a node including word processing document types.

In some embodiments, the length and/or width of the hierarchical data organization may be based on various optimal criteria. For example, organization service 410 may use optimal criteria based on height, width, and/or depth thresholds to determine an optimal and/or preferred structure of the hierarchical data organization. In some embodiments, optimal criteria may be based on minimizing the navigational effort of the user because navigational effort scales with the square root of the number of items in the library.

At block 625, organization service 410 generates and/or updates organization data. In some embodiments, organization service 410 generates folder representation data that includes a tag and links to one or more documents. For example, if hierarchical content metadata, such as a tag count, is below the document viewing and/or item presentation threshold, documents associated with the tag and the tag itself may be assigned to or included in folder representation data. The folder representation data may be included in the organization data to represent the hierarchical relationship of documents and folders. Further details and/or embodiments for generating organization data is described in further detail with respect to FIG. 7. In some embodiments, organization service 410 generates organization data by associating document content metadata and/or assigning keywords to the hierarchical data organization structure. For example, an output of block 620 may correspond to the structure of the representation illustrated in FIG. 1 but without the labels to the nodes and/or connections to document and/or items. Organization service 410 may associate and/or assign document content metadata, such as tags and/or keywords, with nodes of the hierarchical data organization based on the hierarchical content metadata. For example, nodes of the hierarchical data organization and/or tree may be assigned keywords of the document content metadata based on the frequencies of respective keywords from the hierarchical content metadata. In some embodiments, document content metadata and/or keywords with the highest frequencies may be recursively selected until a condition is met, which is described in further detail below. Organization service 410 may associate documents and/or items with the organization data based on corresponding document content metadata and/or keywords that are selected as leaf nodes of the hierarchical data organization.

In some embodiments, organization service 410 may assign a generic and/or placeholder category to a node. For example, if there is not an applicable keyword and/or tag within a frequency range, organization service 410 may assign an "other" and/or "miscellaneous" keyword to a node in the hierarchical data organization. The generic and/or placeholder keyword may be assigned to an internal and/or leaf node in the hierarchical data organization.

At block 630, organization service 410 stores the organization data in a data store. For example, organization service 410 may store the organization data in taxonomy data repository 434. In some embodiments, organization data may be stored in various formats, such as JSON, XML, a data object format, tree data structure, TreeMap, a proprietary file format, or any other format or data structure. The organization data and/or a portion of the organization data may be later accessed and/or retrieved from data storage to present a user interface and/or a portion of the user interface, such as user interface 200 of FIGS. 2A-2C.

At block 635, organization service 410 transmits and/or presents the organization data and/or a portion of the organization data. For example, organization service 410 may provide a level, a node, a keyword, and/or an item of organization data for presentation in a user interface. User interface 200 of FIG. 2A illustrates a level of a hierarchical data organization, which may have been transmitted and/or presented by organization service 410 based on the root node and/or level of the hierarchical data organization. Other user interfaces include an audio user interface that outputs audio corresponding to the organization data and/or portions of the organization data. In some embodiments, a node and/or level may be provided by organization service 410 to retail server 404 for presentation on user computing device 402. Organization data may be in a data format that permits partial transmission of the data structure such as a level and/or node that is linked to other levels and/or nodes in the data structure. Transmission of a level, node, or a part of the organization data may be advantageous by reducing memory and/or processing requirements. In some embodiments, more than one level and/or node of the organization, data such as the entire data structure, may be transmitted and/or provided for presentation.

While analyzing and/or processing an entire library and/or collection of items is discussed herein, it will be appreciated that the methods and/or techniques of reorganization may be applied to a subset of items in a collection and/or be configurable. In a library example, there may be documents and/or areas of a digital library that remain manually organized by a user. Thus, organization service 410 may ignore areas by configuration, particular document types, and/or directories of the library and/or file system to be managed by a user. The remaining areas and/or configurable directories may be automatically organized and/or monitored by organization service 410. For example, a news article directory of thousands of articles, Rich Site Summary ("RSS") feed, and/or video directories may be automatically managed by organization service 410, but a personal document directory may remain manually organized by the user.

Figure 7:
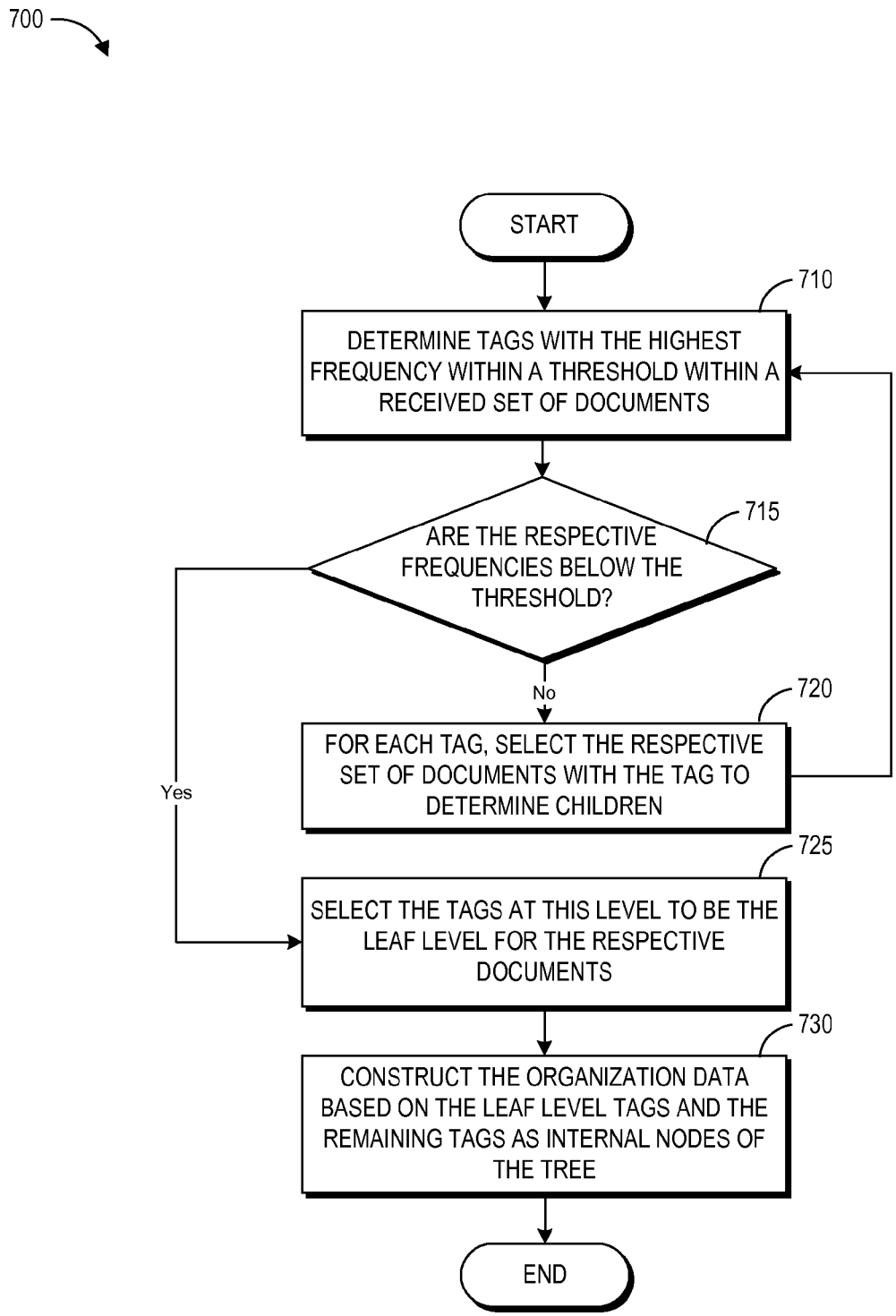
FIG. 7 is a flow diagram of an illustrative method implemented at least in part by an organization service for associating organization data with document metadata.

FIG. 7 is a flow diagram of an illustrative method 700 implemented at least in part by organization service 410 for associating and/or assigning organization data with document and/or item metadata. In some embodiments, similar to illustrative method 600, organization service 410 may include organization module 576, and may implement illustrative method 700. In other embodiments, retail server 404 may include organization module 576, and may implement illustrative method 700. In yet other embodiments, functions of the organization module 576 to implement illustrative method 700 may be implemented entirely or in part by a user device, such as user computing device 102, in some embodiments. Some of the blocks of illustrative method 700 may be implemented by organization module 576 to generate organization data and/or associate metadata with organization data. Thus, some of the blocks of illustrative method 700 may be similar to blocks 620 and/or 625 of FIG. 6 described above. For example, some of the features and/or functions of illustrative method 700 may be implemented by organization service 410 and/or organization module 576.

Illustrative method 700 begins at block 710, where organization service 410 determines hierarchical content metadata, which is based on the document and/or item content metadata. For example, tags and/or document content metadata from a set of documents may be analyzed to select tags with the highest frequency within a threshold number. As described above, there may be a document viewing and/or node threshold that may be used to select tags until the threshold is met. In the example of a library with one hundred documents, the node threshold may be set to three, and, as a result, organization service 410 may initially select the three highest frequency tags for the first level.

At block 715, organization service 410 determines whether the respective frequencies are below a threshold. As described above, organization service 410 may use a document viewing threshold to determine whether the documents associated with a particular tag are below the document viewing threshold. For example, if the document viewing threshold is ten, then a tag associated with nine documents would be within the document viewing threshold. Block 725 describes the behavior of organization service 410 on reaching the condition where the documents associated with the tag are below the document viewing threshold, which is described below. However, if the documents associated with the tag are above the document viewing threshold, then organization service proceeds to block 720, which is described below. For example, if there are thirty documents associated with the tag, "good versus evil," and the document viewing threshold is ten, then the documents associated with that tag are further processed as described below with reference to bock 720. Furthermore, the tag associated with documents that are above the document viewing threshold may be selected as an internal node by organization service 410.

At block 720, organization service 410 processes the set of documents associated with the current tag. From the example above with thirty documents associated with the tag, those thirty documents may be selected as the current set of documents for processing. Organization service 410 may provide the current set of documents to block 710, described above, to a further determine sub tags and/or the highest frequency tags associated with that current set of documents. Continuing with the example of thirty documents, organization service 410 may further analyze metadata to determine the next highest frequencies for that set of thirty documents, such as "classics," "fairytale," "young adult." Thus, organization service 410 may recursively, iteratively, and/or repeatedly determine internal nodes and/or sub-nodes by continuously repeating blocks 710, 715, and/or 720 until an exit condition is reached.

At block 725, organization service 410 determines that the tag for the particular node is a leaf node and processes the tag accordingly. For example, where the document viewing threshold was ten and a tag was selected by organization service 410 that was associated with nine documents, organization service 410 may link and/or connect documents associated with the tag. As described above, the links and/or connections of the documents to a leaf node may be indicated and/or presented via a user interface to display and/or present those documents.

At block 730, organization service 410 completes the organization data based on the previously executed blocks. For example, organization service 410 selects and/or determines a label and/or tag for the first node, which represents the start of the library and/or beginning of the plurality of documents. The internal nodes determined by the blocks of illustrative method 700, such as blocks 710, 715, and/or 720, are selected as internal nodes of the organization data and/or the order in which the internal nodes are processed are used to determine the level of the internal nodes within the organization data. Furthermore, organization service 410 uses the determination of the leaf nodes to select the leaf nodes of the organization data. Finally, organization service 410 uses the tags associated with the leaf nodes to link the documents associated with that tag into the organization data.

Additionally or alternatively to illustrative method 700, other methods and/or techniques may be used to construct the organization data and/or to cluster the items. For example, if a hierarchical taxonomy is provided that associates items within the taxonomy, organization service 410 may use a clustering algorithm to group items. One or more models and/or algorithms known in the art may be used by organization service 410 for determining clusters such as hierarchical clustering; centroid models such as the k-means algorithm; distribution based clustering; density based clustering; subspace clustering; latent space clustering; and/or graph-based models. Furthermore, it will be appreciated that supervised or semi-supervised machine learning may be implemented by the interaction service for determining clusters. For example, organization service 410 may implement a feedback mechanism such that preferred tags and/or keywords selected by a user are given higher prominence and/or are assigned higher statistical weight. One example algorithm for determining clusters may include the following: select n endpoint as an initial centroid; until no more centroids change, form n clusters by assigning each point to its closest centroid, and compute the centroid for each cluster. For example, where a hierarchical taxonomy is provided with multiple paths for items within the taxonomy, a clustering centroid may be used to evenly group items with similar keywords and/or tags.

In some embodiments, a particular item may be assigned to more than one leaf node by organization service 410. For example, Twenty Thousand Leagues Under the Sea may be assigned to the leaf node "Steampunk" and the leaf node "Classics," as illustrated in FIG. 1. It may be advantageous to assign items to more than one leaf node to improve navigational efficiency because a user may locate an item from more than one path in the hierarchical data organization and/or organization data.

Furthermore, it will be appreciated that, in some embodiments, the leaf of a hierarchical data organization and/or organization data may correspond to and/or include a document and/or item. For example, the methods and systems for dynamically organizing a library of documents may include data structures where the leaves of the data structures correspond to documents.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   determining a number of displayable document representations that will fit within a user interface by dividing a display size of the user interface by a document representation size, wherein the display size comprises a first pixel length and a first pixel width of the user interface, and wherein the document representation size comprises a second pixel length and a second pixel width of a graphical representation of a document in the user interface;
   assigning the number of displayable document representations to a document viewing threshold;
   receiving a document addition request, the document addition request indicating at least one document to be added to a plurality of documents in an electronic file system;
   in response to receiving the document addition request, generating a plurality of updated documents that includes the plurality of documents and the at least one document;
   analyzing a first document of the updated documents to determine a tag associated with the first document, wherein the tag comprises a textual label associated with the first document;
   calculating a tag count, wherein the tag count comprises a value that represents a number of documents from the updated documents that are associated with the tag;
   determining that the tag count is below the document viewing threshold;
   in response to determining that the tag count is below the document viewing threshold, generating folder representation data comprising the tag and links to the updated documents that are associated with the tag;
   generating organization data comprising the folder representation data, wherein the organization data represents a hierarchical relationship of the updated documents and one or more folders;
   storing the organization data in an electronic data store; and
   sending the folder representation data of the organization data for presentation in the user interface.

2. The computer-implemented method of claim 1, wherein analyzing the first document to determine the tag comprises executing natural language processing of content of the first document, and further comprising:
   executing natural language processing of content of a second document of the updated plurality of documents to determine that the tag is associated with the second document, and wherein the folder representation data comprises links to the first document and the second document.

3. A system comprising:
   an electronic data store configured to at least store a plurality of items; and a computing system comprising one or more hardware computing devices, said computing system in communication with the electronic data store, and configured to at least:

determine a number of displayable item representations that will fit within a user interface by dividing a display size of the user interface by an item representation size, wherein the display size comprises a first pixel length and a first pixel width of the user interface, and wherein the item representation size comprises a second pixel length and a second pixel width of a graphical representation of an item in the user interface;

assign the number of displayable item representations to an item presentation threshold;

determine item content metadata based at least in part on the plurality of items, the item content metadata associated with a first item of the plurality of items, wherein the item content metadata comprises a tag associated with the first item;

generate hierarchical content metadata for the plurality of items based at least in part on the item content metadata, wherein the hierarchical content metadata comprises a value that represents a number of items from the plurality of items that are associated with the tag;

determine a hierarchical data organization structure that represents an organization relationship of the plurality of items based at least in part on a number of the plurality of items and the item presentation threshold, the hierarchical data organization structure comprising at least a first level and a second level that descends from the first level;

generate organization data by assigning the tag of the item content metadata to a node of the second level of the hierarchical data organization structure, based at least in part on the hierarchical content metadata;

store the organization data in the electronic data store; and send the tag of the organization data for presentation.

4. The system of claim 3, wherein determining the item content metadata comprises:

execute natural language processing of content of the first item to determine that the tag is associated with the first item; and execute natural language processing of content of a second item of the plurality of items to determine that the tag is associated with the second item, and wherein the node of the second level of the hierarchical data organization structure is linked to the first item and the second item.

5. The system of claim 3, wherein an item of the plurality of items comprises at least one of word processing document data, recorded video data, recorded audio data, image data, text data, or spreadsheet data.

6. The system of claim 3, wherein the second level of the organization data comprises at least a second node, the second node associated with at least one tag, wherein the second node is linked to at least a first node of the first level.

7. The system of claim 3, wherein the computing system is further configured to at least:

receive a reorganization request, the reorganization request indicating at least one item to be removed from or added to the plurality of items in the electronic data store;

generate a plurality of updated items from the plurality of items to remove or add the at least one item;

generate second hierarchical content metadata for the updated items based at least in part on the hierarchical content metadata;

generate second organization data based at least in part on the second hierarchical content metadata, wherein a second level of the second organization data is different than the second level of the generated organization data;

store the second organization data in the electronic data store; and send the second level of the second organization data for presentation.

8. The system of claim 3, wherein the computing system is further configured to at least:

generate the reorganization request in response to a threshold number of item removals or additions.

9. The system of claim 3, wherein the computing system is further configured to at least:

receive a second item;

determine second item content metadata associated with the second item;

generate updated organization data such that the second item is linked to the node of the second level of the hierarchical data organization structure; and send the second level of the updated organization data for presentation.

10. The system of claim 9, wherein the computing system is further configured to at least:

receive a user reorganization request, the user reorganization request generated in response to a user selection;

generate second hierarchical content metadata for the plurality of items based at least in part on the second item content metadata;

generate second organization data based at least in part on the second hierarchical content metadata, wherein a second level of the second organization data is different than the second level of the organization data;

store the second organization data in the electronic data store; and send the second level of the second organization data for presentation.

11. The system of claim 3, wherein determining the hierarchical data organization structure is further based at least in part on optimal criteria, the optimal criteria associated with at least one of a height or width criteria.

12. The system of claim 3, wherein the plurality of items comprise at least one file of an operating system.

13. A computer-implemented method comprising:

determining a number of displayable item representations that will fit within a user interface by dividing a display size of the user interface by an item representation size, wherein the display size comprises a first pixel length and a first pixel width of the user interface, and wherein the item representation size comprises a second pixel length and a second pixel width of a graphical representation of an item in the user interface;

assigning the number of displayable item representations to an item presentation threshold;

determining item content metadata based at least in part on a plurality of items, the item content metadata associated with a first item of the plurality of items, wherein the item content metadata comprises a tag associated with the first item;

generating hierarchical content metadata for the plurality of items based at least in part on the item content metadata, wherein the hierarchical content metadata comprises a value that represents a number of items from the plurality of items that are associated with the tag;

determining a hierarchical data organization structure that represents an organization relationship of the plurality of items based at least in part on a number of the plurality of items and the item presentation threshold, the hierarchical data organization structure comprising at least a first level and a second level that descends from the first level;

generating organization data by assigning the tag of the item content metadata to a node of the second level of the hierarchical data organization structure, based at least in part on the hierarchical content metadata; and sending at least one level of the organization data for presentation.

14. The computer-implemented method of claim 13, further comprising:

receiving a reorganization request, the reorganization request indicating at least one item to be removed from or added to the plurality of items;

generating a plurality of updated items from the plurality of items to remove or add the at least one item;

generating second hierarchical content metadata for the updated items based at least in part on the hierarchical content metadata;

generating second organization data based at least in part on the second hierarchical content metadata, wherein a second level of the second organization data is different than the second level of the generated organization data; and sending the second level of the second organization data for presentation.

15. The computer-implemented method of claim 14, wherein the second organization data has at least one more or one less level than the organization data.

16. The computer-implemented method of claim 13, further comprising:

receiving a second item;

determining second item content metadata associated with the second item;

generating updated organization data such that the second item is linked to the node of the second level of the hierarchical data organization structure; and sending the second level of the updated organization data for presentation.

17. The computer-implemented method of claim 16, further comprising:

receiving a reorganization request;

in response to receiving the reorganization request, generating second hierarchical content metadata for the plurality of items based at least in part on the second item content metadata;

generating second organization data based at least in part on the second hierarchical content metadata, wherein a second level of the second organization data is different than the second level of the organization data; and sending the second level of the second organization data for presentation.

18. The computer-implemented method of claim 13, wherein determining the item content metadata comprises:

executing natural language processing of content of the first item to determine that the tag is associated with the first item; and executing natural language processing of content of a second item of the plurality of items to determine that the tag is associated with the second item, and wherein the node of the second level of the hierarchical data organization structure is linked to the first item and the second item.

* * * * *